(12) United States Patent
Jiang et al.

(10) Patent No.: US 10,300,968 B2
(45) Date of Patent: *May 28, 2019

(54) TRACK TENSION DEVICE AND TRACK MOVING DEVICE (71) Applicant: SUZHOU RADIANT PHOTOVOLTAIC TECHNOLOGY CO., LTD, Suzhou (CN)

(72) Inventors: Changsheng Jiang, Suzhou (CN); Jiayong Jiang, Suzhou (CN); Jianrong Xu, Suzhou (CN)

(73) Assignee: SUZHOU RADIANT PHOTOVOLTAIC TECHNOLOGY CO., LTD, Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/743,685

(22) PCT Filed: Jan. 26, 2017

(86) PCT No.: PCT/CN2017/072758
§ 371 (c)(1),
(2) Date: Jan. 11, 2018

(87) PCT Pub. No.: WO2018/053980
PCT Pub. Date: Mar. 29, 2018

(65) Prior Publication Data
US 2018/0237085 A1  Aug. 23, 2018

(30) Foreign Application Priority Data
Sep. 21, 2016  (CN) .......................... 2016 1 0835954

(51) Int. Cl.
B62D 55/30 (2006.01)
B62D 55/24 (2006.01)
(Continued)

(52) U.S. Cl.
CPC ........... *B62D 55/30* (2013.01); *B62D 55/244* (2013.01); *B62D 55/32* (2013.01); *H02S 40/10* (2014.12);
(Continued)

(58) Field of Classification Search
CPC ...... B62D 55/30; B62D 55/244; B62D 55/32; H02S 40/10
(Continued)

(56) References Cited

U.S. PATENT DOCUMENTS 1,568,241 A    1/1926  Rimailho
3,736,032 A *  5/1973  Mosshart ............... B62D 55/04
                                                      305/195
(Continued)

FOREIGN PATENT DOCUMENTS

CA    2141777 A1    8/1996
CN    2174389 Y     8/1994
(Continued)

Primary Examiner — Kip T Kotter
(74) Attorney, Agent, or Firm — Mark M. Friedman (57) ABSTRACT A track tension device and a track moving device are provided. The track tension device includes an upper transmission belt, a lower transmission belt, an upper tension portion, a lower compression portion and a resilient support portion. The track moving device includes the track tension device.

11 Claims, 7 Drawing Sheets (51) Int. Cl.
*H02S 40/10* (2014.01)
*B62D 55/32* (2006.01)
*B62D 55/06* (2006.01)
*A63H 17/26* (2006.01)
*A63H 29/22* (2006.01)
*A63H 11/00* (2006.01)
*A63H 11/04* (2006.01)
*A63H 17/00* (2006.01)
*A63H 17/14* (2006.01)
*A47L 9/00* (2006.01)
*A47L 11/40* (2006.01)

(52) U.S. Cl.
CPC ............ *A47L 9/009* (2013.01); *A47L 11/4066* (2013.01); *A47L 2201/00* (2013.01); *A63H 11/00* (2013.01); *A63H 11/04* (2013.01); *A63H 17/00* (2013.01); *A63H 17/14* (2013.01); *A63H 17/26* (2013.01); *A63H 29/22* (2013.01); *B62D 55/06* (2013.01)

(58) Field of Classification Search
USPC .......................................................... 474/111
See application file for complete search history.

(56) References Cited

U.S. PATENT DOCUMENTS

| | | | | |
|---|---|---|---|---|
| 4,305,476 A | | 12/1981 | Blass et al. | |
| 5,197,420 A | * | 3/1993 | Arnold | F01L 1/348 |
| | | | | 123/90.15 |
| 5,606,941 A | * | 3/1997 | Trzmiel | F01L 1/024 |
| | | | | 123/90.15 |
| 5,720,683 A | * | 2/1998 | Patton | F16H 7/08 |
| | | | | 474/109 |
| 6,599,209 B1 | * | 7/2003 | Ullein | F16H 7/08 |
| | | | | 474/111 |
| 7,597,167 B2 | | 10/2009 | Kubota | |
| 8,240,783 B2 | * | 8/2012 | Johnson | B62D 55/30 |
| | | | | 305/141 |
| 9,103,410 B2 | * | 8/2015 | Ullein | F16H 7/00 |
| 9,435,408 B2 | * | 9/2016 | Lindner | F01L 1/022 |
| 2002/0165056 A1 | * | 11/2002 | Ullein | F16H 7/08 |
| | | | | 474/110 |
| 2006/0028066 A1 | | 2/2006 | Yamamoto | |

FOREIGN PATENT DOCUMENTS

| | | |
|---|---|---|
| CN | 101983889 A | 3/2011 |
| CN | 104163213 A | 11/2014 |
| CN | 204052286 U | 12/2014 |
| CN | 106183786 A | 12/2016 |
| CN | 106184444 A | 12/2016 |
| CN | 106269624 A | 1/2017 |
| CN | 206031039 U | 3/2017 |
| CN | 206155605 U | 5/2017 |
| DE | 102015201882 A1 | 8/2016 |
| JP | S58116274 A | 7/1983 |
| JP | H10129547 A | 5/1998 |
| JP | 2006213165 A | 8/2006 |
| SU | 1652168 A1 * | 5/1991 |

* cited by examiner

TRACK TENSION DEVICE AND TRACK MOVING DEVICE

FIELD OF THE INVENTION

The present invention relates to a track tension device and a track moving device.

BACKGROUND OF INVENTION

Conventional wheeled robots generally can only be applied to level ground, but cannot be applied to sloping planes like solar panels. To solve a technical issue that the wheeled robot easily slides and falls off from the sloping planes, the present invention relates to a track moving device that increases friction between a robot and a sloping plane such that the robot can freely move on a solar panel.

A track is a flexible link loop on a gear set. Usually, the gear set is relatively fixed and difficult to adjust. Therefore, the track needs to be adjusted during installation of the track, especially adjustment of the track tension. Track tension has a significant effect on service life of the track. Over tightness or over looseness are not good for the track. Different environments require tracks with different degrees of tightness. When applied to drive on a hard road, the track should be tightened tighter. When applied to drive on an irregular road, the track should be loosened. In prior art, the track tension adjusting device comprises a bracket, a crank arm, a shaft sleeve, a worm gear, a worm, a screw rod, a friction plate and a bushing, etc. The structure is relatively complicated and adjustment usually requires repeated inspection to achieve the track tension requirements. After adjustment, the track can only be applied to one road environment, and to meet different road conditions, the rack usually needs to be adjusted again.

Therefore, it is required to provide a device capable of adjusting the tension of the track in real time and capable of automatically adjusting the tightness of the track to meet the requirements of the track running under various road conditions.

SUMMARY OF INVENTION

An objective of the present invention is to provide a track tension device to solve the technical issues of structural complication, poor stability and inconvenience of adjustment of a conventional track tension adjusting device.

To solve the above issues, the present invention provides a track tension device for a track. The track tension device includes: an upper run being an upper portion of a transmission belt disposed on the track, and at least one track inner tooth disposed on a lower surface of the upper run; a lower run of the transmission belt being a lower portion of the transmission belt, and at least one track inner tooth disposed on an upper surface of the lower run; an upper tension portion having an upper end disposed tangentially to or engaged with the lower surface of the upper run, and configured to tension the upper run; at least one lower compression portion having a lower end disposed tangentially to the upper surface of the lower run, and configured to compress the lower run; and a resilient support portion having an end connected to the upper tension portion and another end connected to the lower compression portion, and configured to support the upper tension portion and the lower compression portion.

Furthermore, the track tension device further includes: a track side plate disposed on a side of the track; at least one longitudinal slot perpendicularly disposed in an upper portion of the track side plate; at least one installing shaft, an end of each installing shaft up-and-down-slidably disposed in one longitudinal slot.

Alternatively, the track tension device further includes: two track side plates disposed respectively on two sides of the track; at least one longitudinal slot disposed perpendicularly in an upper portion of each track side plate; at least one installing shaft, two ends of each installing shaft up-and-down-slidably disposed respectively in opposite two of the longitudinal slots, and the opposite two of the longitudinal slots located respectively on the two track side plates.

Furthermore, the installing shaft includes at least one gear installation shaft; the upper tension portion includes: at least one tension gear, each tension gear installed on one gear installation shaft through a roller bearing and having an upper end engaged with the lower surface of the upper run.

Furthermore, the tension gear is a double straight tooth cylindrical gear and includes: two cylindrical gears engaged with the lower surface of the upper run; and a linkage portion disposed between the two cylindrical gears; wherein diameters of the two cylindrical gears cylindrical gear are the same, and a diameter of the linkage portion is less than a diameter of the cylindrical gear.

Furthermore, the installing shaft further includes at least one transmission-wheel installation shaft; the upper tension portion further includes: at least one tension transmission wheel, each tension transmission wheel disposed on a transmission-wheel installation shaft through a roller bearing, and disposed tangentially to or engaged with the tension gear; and a V-shaped bracket having two transmission-wheel installation shafts disposed respectively on two ends of the V-shaped bracket, and a gear installation shaft disposed above the V-shaped bracket; wherein the gear installation shaft and the transmission-wheel installation shafts parallel each other, and the gear installation shaft is located above a middle place between the two transmission-wheel installation shafts.

Furthermore, the upper tension portion further includes: a V-shaped bracket having two gear installation shafts disposed respectively on two ends of an upper portion of the V-shaped bracket, and a lower end of the V-shaped bracket connected to the resilient support portion; or a gear bracket having at least one gear installation shaft installed on an upper end of the gear bracket, and the resilient support portion connected to a lower end of the gear bracket.

Furthermore, the V-shaped bracket includes two V-shaped planar plates paralleling each other; and two crossbeams, two ends of each crossbeam securely connected respectively to the two V-shaped planar plates; wherein the transmission-wheel installation shafts or the gear installation shaft is perpendicular to the V-shaped planar plate.

Furthermore, the lower compression portion includes at least one tension compression plate disposed tangentially to the upper surface of the lower run.

Furthermore, the resilient support portion includes a reverse V-shaped resilient element, an upper portion of the reverse V-shaped resilient element connected to a lower end of the upper tension portion, and two ends of a lower portion of the reverse V-shaped resilient element connected respectively to two lower compression portions.

Furthermore, the upper end of the reverse V-shaped resilient element is a semicircular corner; and two circular hooking rings are disposed respectively on the two ends of the lower portion of the reverse V-shaped resilient element, the circular hooking rings are connected respectively to the two lower compression portions.

Furthermore, the resilient support portion includes a spring set comprising at least one spring; an upper portion of the spring set connected to a lower end of the upper tension portion, and a lower portion of the spring set connected to the at least one lower compression portion.

To solve the above issue, the present invention further provides a track moving device, including the above-mentioned track tension device. The track moving device may be a robot or motor vehicle, with a track.

Advantages of the present invention lie in that the track tension device of the present invention changes the conventional structures and employs a "floating assembly design". In other words, a resilient support portion is added between the upper tension portion the lower compression portion. Through the longitudinal slot, up-and-down floating of the tension device is achieved, tension force during moving of the track is real-timely adjusted, a contacting area and adhesion force of the track and the ground are increased such that stability of the moving of the track is improved. Such adjustment, according to the track operation to achieve flexible adjustment, can mitigate wear and tear of the parts of rigid adjustment, reduce the friction between parts and increase the service life of the track. The adjusted track can timely adapt to the road. The track moving device with the track tension device can achieve power-saving purposes. The track tension device is structurally simple and is easy to assemble.

100 solar panel cleaning robot/cleaning robot/robot, 300 slope plane, 400 server;

1 robot body, 2 cleaning device, 3 power system, 4 control system, 5 electric power system; 11 body member;

21 cleaning motor, 22 roller brush, 23 transmission mechanism, 24 debris baffle, 25 liquid dispensing container, 26 nozzle head, 27 forked pipe, 28 water pump;

31 left-front wheel, 32 right-front wheel, 33 left-rear wheel, 34 right-rear wheel, 35 left-drive motor, 36 right-drive motor, 37 track, 38 hub gear, 39 track tension device;

41 data acquisition unit, 42 processor, 43 storage unit, 44 alarm unit, 45 wireless communication unit; 51 battery box;

211 cleaning motor shaft, 221 roller brush driven shaft, 231 driving gear, 232 driven gear, 233 double gear;

311 left-front wheel hub, 312 left-front wheel axis, 321 right-front wheel hub, 322 right-front wheel axis, 331 left-rear wheel hub, 341 right-rear wheel hub;

371 track housing, 372 track inner tooth, 373 skid-proof block, 374 upper run, 375 lower run;

391 upper tension portion, 392 lower compression portion, 393 resilient support portion, 394 track side plate, 395 track top plate, 396 longitudinal slot, 397 installing shaft, 398 gear bracket;

411 accelerometer sensor, 412 magnetic sensor, 413 distance sensor, 414 counter, 415 image sensor;

2331 large gear ring, 2332 small gear ring;

3911 V-shaped bracket, 3912 tension transmission wheel, 3913 tension gear, 3914 V-shaped planar plate, 3915 crossbeam, 3916 cylindrical gear, 3917 cylindrical linkage portion;

3921 tension compression plate, 3931 reverse V-shaped resilient element;

3971 gear installation shaft, 3972 transmission-wheel installation shaft.

DETAILED DESCRIPTION OF PREFERRED EMBODIMENTS

A preferred embodiment of the present invention will be introduced with reference to appended figures as follows to demonstrate that the present invention may be implemented. The embodiment of the present invention can be fully introduced to those skilled in the art to make technical contents more clear and easy to understand. The present invention can be embodied in many different forms of embodiment, and the scope of protection of the present invention is not limited to the embodiments set forth herein.

In the appended figures, structurally identical components are designated by the same reference numerals, and structurally or functionally similar components throughout are designated by similar numerical reference numerals. The dimensions and thicknesses of each component shown in the figures are arbitrarily shown. The size and thickness of each component are not limited, and for the sake of clarity, the thickness of the components is exaggerated somewhat in some places in the figures.

Direction terms mentioned by the present invention, for example "upper", "lower", "front", "rear", "left", "right", "inner", "outer", "side", etc. are merely directions in the appended figures for only explaining and illustrating the present invention but not to limit the protection scope of the present invention.

When some part is described to be "on" another part, the part may be directly disposed on the other part; alternatively, an intervening part may exist, the part is disposed on the intervening part, and the intervening part is disposed on the other part. When a part is described to be "installed on" or "connected to" another part, it may be understood that the parts are directly "installed" or "connected" to each other, alternatively it is understood that one part is "installed" or "connected" to the other part through an intervening part.

Embodiment

Figure 1:
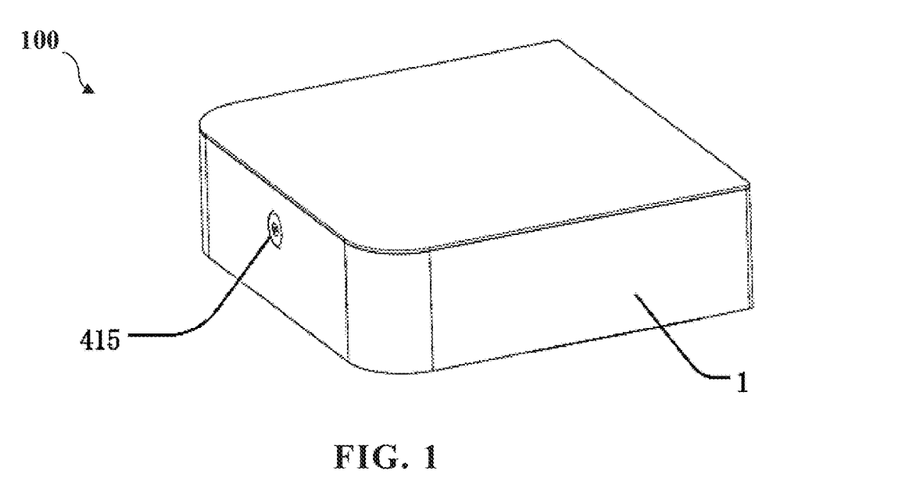
FIG. 1 is an overall appearance schematic view of a cleaning robot in an embodiment of the present invention.
Figure 2:
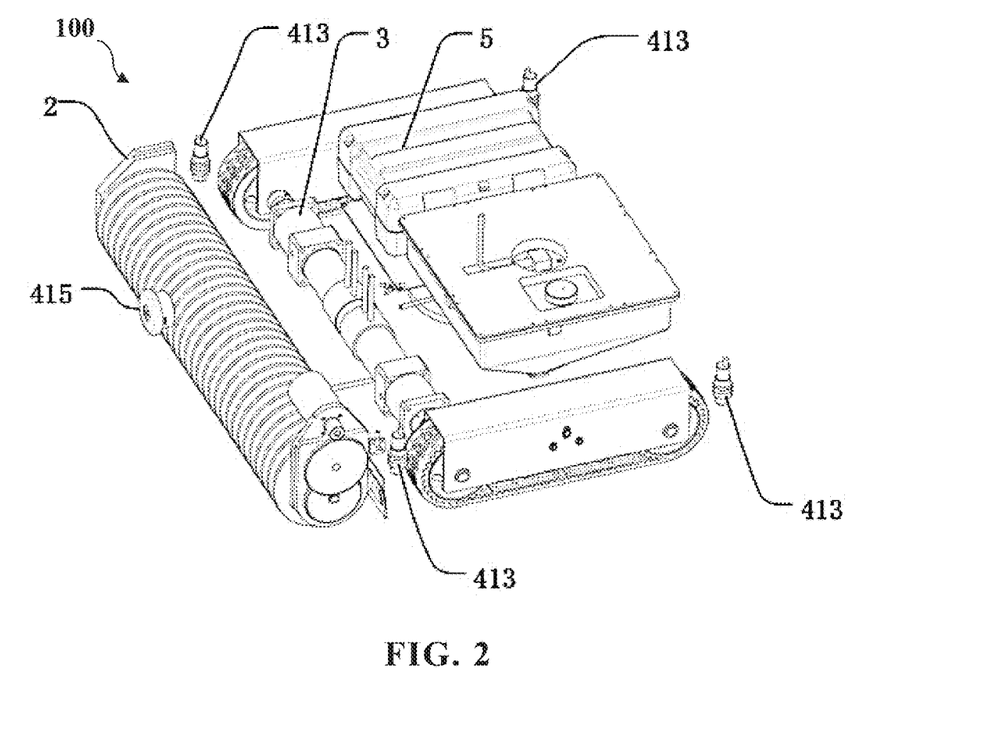
FIG. 2 is an internal structural schematic view of the cleaning robot in the embodiment of the present invention.
Figure 3:
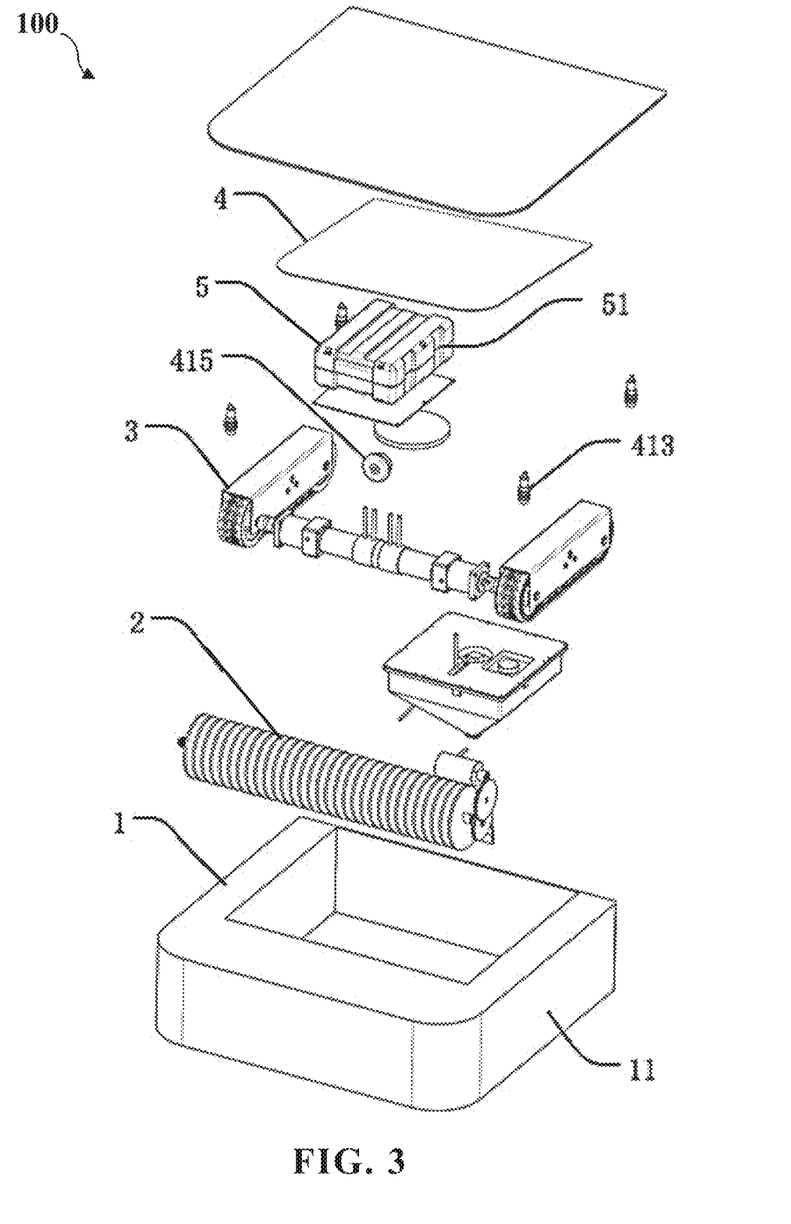
FIG. 3 is an exploded structural schematic view of the cleaning robot in the embodiment of the present invention.

With reference to FIGS. 1 to 3, the present invention provides a solar panel cleaning robot 100 (abbreviated as "cleaning robot" or "robot" hereinafter) comprising a robot body 1. The robot body 1 can move on at least one solar panel. A cleaning device 2, a power system 3, a control system 4 and an electric power system 5 are disposed on externally or internally to the robot body 1.

The cleaning device 2 is configured to clean solar panels during moving of the robot body. The power system 3 is configured to adjust a moving direction and a moving speed of the robot body 1 on the solar panel, and to control the robot body 1 to move, stop or turn. The control system 4 is connected to the power system 3 and the cleaning device 2, and is configured to transmit various control signals to the power system 3 and the cleaning device 2. The electric power system 5 is connected to the power system 3, the cleaning device 2 and the control system 4, and is configured to provide the power system 3, the cleaning device 2 and the control system 4 with power.

During normal work of the solar panel cleaning robot 100 of the present invention on the solar panel, when the electric power system 5 is switched on, the control system 4 transmits at least one moving control instruction and at least one cleaning control instruction, the power system 3, according to the moving control instruction, controls the robot body 1 to move along a pre-planned path. In the meantime, the cleaning device 2 switches on the cleaning device 2 according to the cleaning control instruction to clean the solar panel. During moving of the robot body 1, the control system 4 transmits multiple moving control instructions, such as deflection correction instruction, turn instruction and U-turn instruction, etc. to the power system 3 to command the robot body 1 to return to an original path in the case of deflection of straight path, i.e. deflection correction. Alternatively, under a certain condition or a certain place, a turn or U-turn (turning back) is performed such that the robot body 1 is driven to move according to a pre-planned optimized path. Specific navigation methods, deflection correction methods and turn or U-turn (turning back) controlling methods for the robot body will be described in detail below. During the entire moving process, no matter what moving mode the robot body 1 proceeds with, such as straight moving, deflection, deflection correction, turn or U-turn, the cleaning device 2 always remains in working status. When the control system 4, based on certain working parameters (for example, the pre-planned path is finished, or the electric power system 5 has insufficient power), transmits a moving control instruction to stop moving, the robot body 1 stops moving. Meanwhile, the control system 4 transmits a cleaning control instruction to switch off the cleaning device 2 to stop cleaning.

Figure 4:
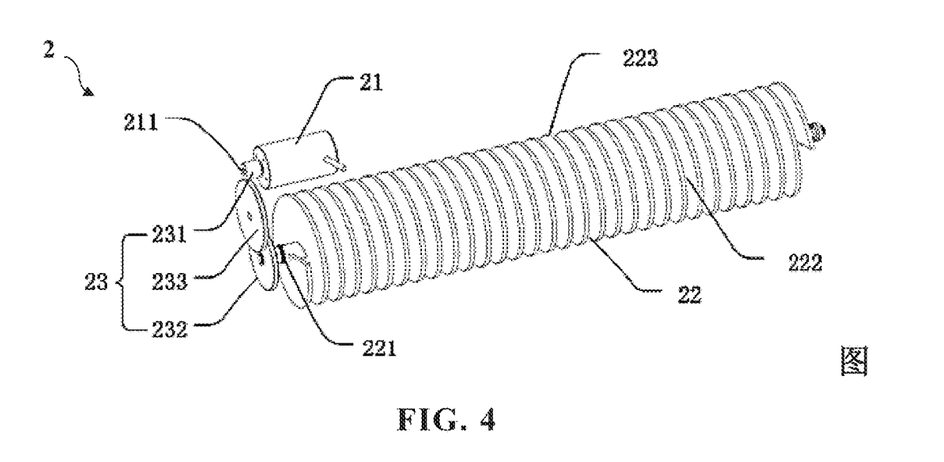
FIG. 4 is a structural schematic view of an embodiment of the cleaning device in the embodiment of the present invention.

With reference to FIG. 4, the cleaning device 2 of the present invention includes a cleaning motor 21, a roller brush 22 and a transmission mechanism 23.

Figure 5:
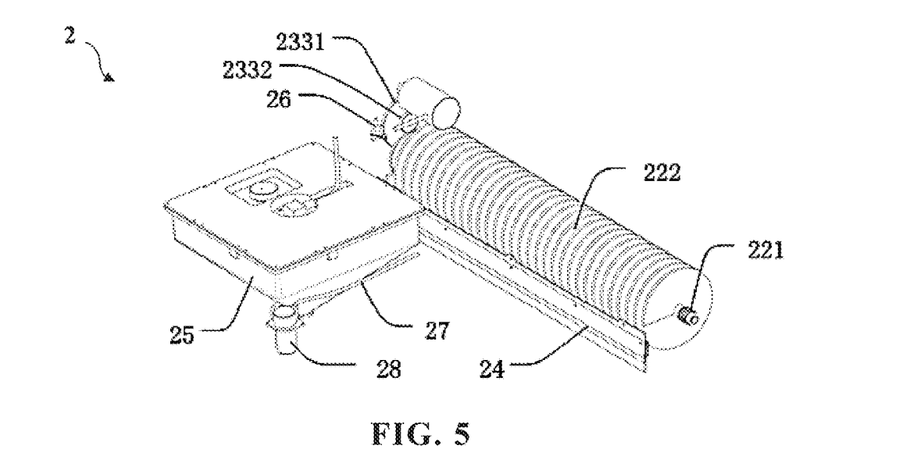
FIG. 5 is the embodiment of the present invention of another embodiment of the cleaning device in the embodiment of the present invention.

With reference to FIGS. 4 and 5, in the present invention, the cleaning motor 21 includes a cleaning motor shaft 211. A roller brush driven shaft 221 is disposed on a center of the roller brush. The transmission mechanism 23 is simultaneously connected to the cleaning motor shaft 211 and the roller brush driven shaft 221, the cleaning motor shaft 211 drives the roller brush driven shaft 221 to rotate through the transmission mechanism 23. The roller brush 22 is disposed a lower portion of a front end of the robot body 1. A lower end of the roller brush 22 directly contacts the solar panel for cleaning the solar panel.

The transmission mechanism 23 is a gear set composed of two or more large and small gears engaged with each other, and is configured to transmit power of the cleaning motor shaft 211 to the roller brush driven shaft 221 while decreasing the rotating speed output by the cleaning motor 21 such that the roller brush 22 is driven to rotate by the slower rotating speed. In the present invention, the transmission mechanism 23 includes a driving gear 231, a driven gear 232 and a double gear 233. the driving gear 231 is disposed on the cleaning motor shaft 211. The cleaning motor shaft 211 is perpendicular to a gear surface of the driving gear 231. The driven gear 232 is disposed on the roller brush driven shaft 221. The roller brush driven shaft 221 is perpendicular to a gear surface of the driven gear 232. The roller brush driven shaft 221 parallels the cleaning motor shaft 211. The double gear 233 includes a large gear ring 2331 and a small gear ring 2332 that are integrally formed together. The large gear ring 2331 is engage with the driving gear 231. The small gear ring 2332 is engaged with the driven gear 232. When the cleaning motor 21 is switched on, the cleaning motor shaft 211 rotates at high speed. After deceleration process by the double gear 233, the roller brush driven shaft 221 drives the roller brush 22 to rotate with a slower speed such that the roller brush 22 can clean the solar panel. A rotating speed ratio of the cleaning motor shaft 211 and the roller brush driven shaft 221 depends on a radius ratio of the large gear ring 2331 and the small gear ring 2332.

The roller brush 22 is a helical roller brush, the helical roller brush includes at least one helical blade 222, the helical blade 222 may have multiple sheet-like bladelets 223. The bladelets 223 are equally spaced apart from one another such that the roller brush 22 and the solar panel fully contact each other, and the parts of the solar panel on which the robot body 1 have passed through can be cleaned. During the moving of the robot body 1 of the present invention, the roller brush 22 constantly cleans attachments such as dust on the solar panel.

With reference to FIG. 5, the cleaning device 2 further includes a debris baffle 24 securely installed on a side surface of the roller brush 22. The roller brush driven shaft 221 in the center of the roller brush 22 parallels the debris baffle 24. With reference to FIG. 2, the cleaning device 2 is disposed on a front end (i.e. front portion of the robot body) of the cleaning robot 100. A rear end (i.e. rear portion of the robot body) of the cleaning robot 100 includes a body member 11. The debris baffle 24 is disposed between the cleaning device 2 and body member 11. During the cleaning, the debris baffle 24 can effectively collect dust, debris, sewage and other debris together to easily remove them from the surface, and can prevent debris from entering the cleaning device 2 or the power system 3 to protect parts in the robot body 1 from damages.

With reference to FIG. 5, the cleaning device 2 further includes a liquid dispensing container 25, at least one nozzle head 26 and a forked pipe 27.

The liquid dispensing container 25 (may be abbreviated as "container 25") is a detachable sealing container for storing water or detergent solution, and a drainage outlet is disposed on a bottom of the liquid dispensing container 25. The nozzle head 26 is disposed on an upper portion or a side portion of the roller brush 22. Each nozzle head 26 includes a nozzle, and the nozzle faces the roller brush 22. The forked pipe 27 includes a main pipe and at least one branch pipe (not shown in the figures) communicating with each other.

The main pipe communicates with the drainage outlet. Each branch pipe communicates with one nozzle head 26. In the present invention, two nozzle heads 26 are preferably disposed respectively on two ends of the roller brush 22, the nozzles face the roller brush 22. The forked pipe 27 is preferably a forked pipe including one main pipe and two branch pipes, and conveys the water or detergent solution in the liquid dispensing container 25 to the two nozzle heads 26.

Figure 6:
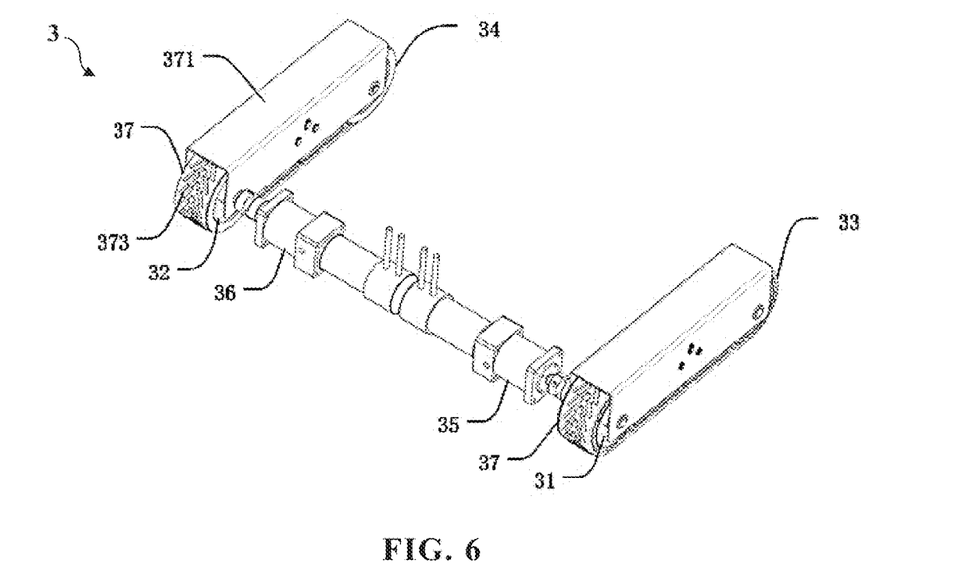
FIG. 6 is an overall structural schematic view of a power system in the embodiment of the present invention.

With reference to FIGS. 5 and 6, the cleaning device 2 further includes a water pump 28 connected to the control system 4 and acquiring at least one water pump control signal from the control system 4. The water pump 28 is disposed on the main pipe 271, and serves as a switch for controlling the liquid dispensing container 25 to discharge liquid and adjusting discharging speed of liquid according to the water pump control signal.

In the present invention, during the roller brush 22 cleaning the solar panel, the control system 4, according to requirement, transmits at least one water pump control signal to the water pump 28, switches on the water pump 28 and adjusting water-pumping speed to make the water or detergent solution in the liquid dispensing container 25 flow out to the nozzle head 26 through the forked pipe 27 and form tiny liquid droplets being radially sprayed to the roller brush 22 such that the sprayed liquid falls on the roller brush 22 as evenly as possible. The rotating roller brush 22 drives the water or detergent solution to fall on the solar panel while the roller brush 22 is used to clean the solar panel, which can effectively enhance the decontamination effect. When there is no enough remaining liquid in the liquid dispensing container 25 or the electric power of the electric power system is insufficient, or when cleaning work is finished, the control system 4 transmits a stop-pumping control signal to the water pump 28 to switch off the water pump 28. A method for determining remaining liquid in the liquid dispensing container 25 and a method for determining remaining electric power of the electric power system 5 will be described in detail below.

In the present invention, the technical effect of the cleaning device 2 lies in that the cleaning work to the solar panel can be finished during the moving of the cleaning robot 100. If necessary, water or detergent solution can be sprayed on the solar panel to be treated to better remove stubborn stains. The cleaning device 2 has fast cleaning speed and excellent effect, which can reduce labor cost effectively without manual monitoring or assistance.

Figure 7:
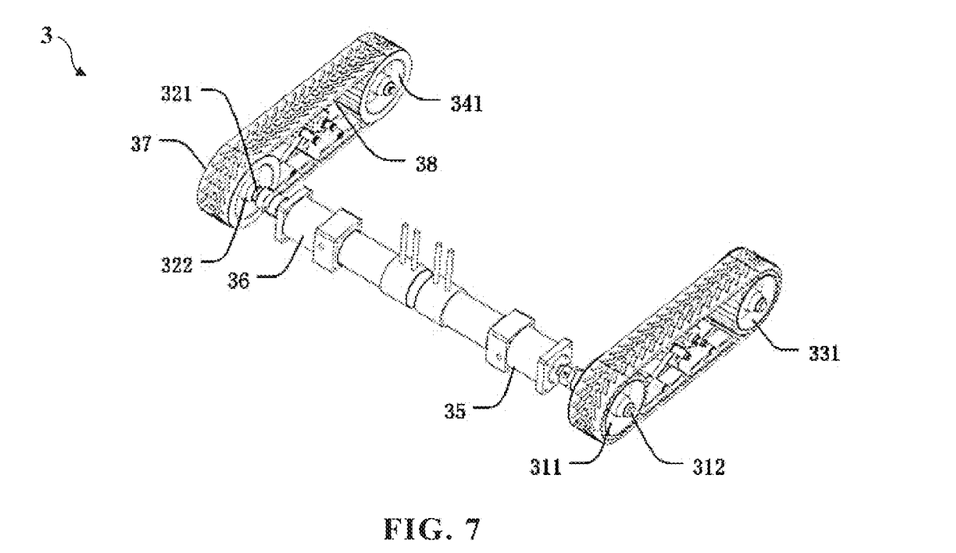
FIG. 7 is a structural schematic view of the power system with removal of a track housing in the embodiment of the present invention.

With reference to FIGS. 6 and 7, in the present invention, the power system 3 is disposed on a bottom of the robot body 1, is configured to drive the robot body 1 to move, and includes a left-front wheel 31, a right-front wheel 32, a left-rear wheel 33, a right-rear wheel 34, a left-drive motor 35, a right-drive motor 36 and two tracks 37.

The left-front wheel 31 is installed on a left side of a front portion of a bottom surface of the robot body, and includes a left-front wheel hub 311 and a left-front wheel axis 312. The left-front wheel axis 312 is disposed on a center of the left-front wheel hub 311. The right-front wheel 32 is installed on a right side of the front portion of the bottom surface of the robot body, and includes a right-front wheel hub 321 and a right-front wheel axis 322. The right-front wheel axis 322 is disposed on a center of the right-front wheel hub 321. The left-rear wheel 33 is installed on a left side of a rear portion of the bottom surface of the robot body, and includes a left-rear wheel hub 331 and a left-rear wheel axis (not shown in the figures). The left-rear wheel hub 331 is disposed on a same straight line with the left-front wheel hub 311, and the left-rear wheel axis is disposed on a center of the left-rear wheel hub 331. The right-rear wheel 34 is installed on a right side of the rear portion of the bottom surface of the robot body, and includes a right-rear wheel hub 341 and a right-rear wheel axis (not shown in the figures). The right-rear wheel hub 341 is disposed on a same straight line with the right-front wheel hub 321. The right-rear wheel axis is disposed on a center of the right-rear wheel hub 341. The right-rear wheel axis is directly connected to or connected through a transmission device (not shown in the figures) to the left-rear wheel axis. The left-drive motor 35, the right-drive motor 36 is securely connected to the robot body 1 through a fastening device, is connected to the electric power system 5 through at least one wire, and is connected to the control system 4 through at least one signal line. The left-drive motor 35 is directly connected to or connected through a transmission device (not shown in the figures) to the left-front wheel axis 312. The right-drive motor 36 is directly connected to or connected through a transmission device (not shown in the figures) to the right-front wheel axis 322. Each of the two tracks 37 is a flexible link loop, one of the tracks 37 covers an outer portion of an annular sidewall of the left-front wheel hub 311 and an outer portion of an annular sidewall of the left-rear wheel hub 331; the other the track 37 covers an outer portion of an annular sidewall of the right-front wheel hub 321 and an outer portion of an annular sidewall of the right-rear wheel hub 341. A track housing 371 is disposed on an external of each the track 37 to protect the track and the hub and prevent debris from entering the track or the hub and affecting the normal moving of the robot body 1.

In the present invention, the control system 4 according to a pre-planned optimized path transmits at least one moving control signal to the left-drive motor 35, the right-drive motor 36 such that the left-drive motor 35 and the right-drive motor 36 synchronously adjust rotating speeds and rotational directions of the left-front wheel 31 and the right-front wheel 32 to further adjust the moving direction and moving speed of the robot body 1, which allows the robot body to implement actions such as straight moving, deflection correction, 90 degrees turn, U-turn.

When the robot body is required to move straight forward, the control system 4 simultaneously transmits a linearly-moving control instruction to the left-drive motor 35 and the right-drive motor 36. The control instruction includes the same motor-rotating speed (for example, rotating speeds of the left-drive motor and right-drive motor are both 60 RPM) and the same rotating direction (for example, the left-drive motor is rotated clockwise, and the right-drive motor is rotated counterclockwise) for the drive motor shaft. Therefore, the left-front wheel 31 and the right-front wheel 32 are driven to synchronously rotate forward. The left-rear wheel 33 and the right-rear wheel 34 are driven wheels, and are driven by the track 37 to synchronously rotate forward with the left-front wheel 31 and the right-front wheel 32 such that the entire robot body 1 moves forward.

When the robot body 1 is required to implement a right deflection, the control system 4 simultaneously transmits a deflection-correction-moving control instruction to the left-drive motor 35 and the right-drive motor 36, and the motor-rotating speed in the control instruction received by the left-drive motor 35 is greater than the motor-rotating speed in the control instruction received by the right-drive motor 36. The difference of the rotating speeds depends on a deflection angle to be adjusted, the less the deflection angle is, the less the rotating speed is. Similarly, when the robot body 1 is required to implement left deflection, the motor-rotating speed in the control instruction received by the left-drive motor 35 is less than the motor-rotating speed in the control instruction received by the right-drive motor 36. When the robot body 1 is back to the original predetermined moving direction, the control system 4 transmits a linearly-moving control instruction again, the rotating speeds of the left-drive motor 35, the right-drive motor 36 become the same once again such that the robot body 1 keeps moving straight forward.

When the robot body is required to implement 90 degrees turn, the control system 4 calculates the rotating speeds and rotating directions of the left-drive motor 35 and the right-drive motor 36 according to a predetermined turning radius. If the turning radius is greater, the rotating directions of the drive motors may be opposite (one is clockwise, the other is counterclockwise), the left-front wheel 31 and the right-front wheel 32 synchronously rotate forward, or one of the wheels is set to stop rotating, to achieve an effect of turn during the moving; If the turning radius is less or on-the-spot turn is performed, the rotating directions of the left-drive motor 35 and the right-drive motor 36 may be designed as the same, both are clockwise or both are counterclockwise. Thus, one of the left-front wheel 31 and the right-front wheel 32 rotates forward, the other rotates backward, one side of the robot body 1 moves forward, and the other side move backward such that small radius turn or on-the-spot turn is performed.

When the robot body is required to implement U-turn (also called "back turn"), the robot body is requested to move to a car lane adjacent to an original car lane after 180 degrees turn. In such case, technical solutions are one-time U-turn and phased U-turn. The control system 4 calculates the rotating speeds and rotating directions of the left-drive motor 35 and the right-drive motor 36 according to the predetermined turning radius. In the solution of one-time U-turn, the turning radius is half a width of the robot body, the front wheel on the inside during the turn stops rotating or rotates forward with an extreme speed (if left U-turn is implemented, the left-front wheel stops rotating; if right U-turn is implemented, the right-front wheel stops rotating), the front wheel on the outside during the turn fast rotates forward to implement left or right U-turn. In the solution of phased U-turn, different solutions may be calculated out according to specific circumstances. The present invention preferably has the following solution: first the robot body 1 is controlled to implement left on-the-spot turn or right on-the-spot turn of 90 degrees, then the robot body is controlled to move forward for a distance being a width of the body member, and finally the robot body is controlled to implement left on-the-spot turn or right on-the-spot turn of 90 degrees. Thus, left or right U-turn may be achieved, and the robot body right moves in a car lane adjacent to a former car lane after the U-turn such that the space of the robot of the present invention can achieve non-repeating and dead-space-free effect.

The power system 3 further includes at least one hub gear 38 evenly disposed on surfaces of the outer portions of the annular sidewalls of the left-front wheel hub 311, the left-rear wheel hub 331, the right-front wheel hub 321 and the right-rear wheel hub 341; and at least one track inner tooth 372, evenly disposed on a surface of an inner sidewall of each track 37, the track inner tooth 372 engaged with the hub gear 38 to ensure that when the two front wheels 31, 32 rotate, the track 37 can cooperate with the two hubs to work normally.

Because the solar panel is comparatively smooth with a certain tilt degree, cleaning robot the robot body easily falls off when moving. To solve such issue, with reference to FIG. 6, the power system 3 further includes at least one skid-proof block 373 protruding from an outer sidewall of each the track 37, the skid-proof blocks 373 may be arranged in an ordered array, and are distributed on the entire track 37. The robot body 1 of the present invention utilizes a track structure, and attaches the skid-proof block 373 on the outer sidewall of the track for increasing the friction coefficient, enhancing gripping force, and preventing the robot body 1 from falling off during the moving. Similarly, the track 37 of the present invention may also dispose at least one skid-proof pattern (not shown in the figures) recessed in the outer sidewall of each track and evenly distributed on the entire track, and the effect thereof is the same as that of the skid-proof block.

In the present invention, the technical effect of the power system 3 lies in that utilizing the structures of the track and the skid-proof block allows the robot body of the cleaning robot to be able to freely move on the solar panel without falling off. The left and right-front wheels are driven respectively with two motors to precisely control the moving status of the robot body such that the robot body can more flexibly adjust the moving direction and implement on-the-spot turn. Therefore, a coverage of the moving path can increase as greater as possible.

With reference to FIGS. 6 and 7, the power system 3 further includes two track tension devices 39, and the track tension devices 39 are disposed respectively in the tracks 37. After installed, the track has a certain looseness degree, and therefore tension adjustment should be implemented to the flexible link loop to ensure the track can normally move forward. The prior art is mounting an induction wheel in front of the track, and the induction wheel is equipped with a separation mechanism and two worms. By adjusting the separation mechanism and the worms, tensioning is achieved. The way and structure of such adjustment is more complicated and the adjustment can only be one-time implemented instead of being implemented real-timely during the operation of the track.

Figure 8:
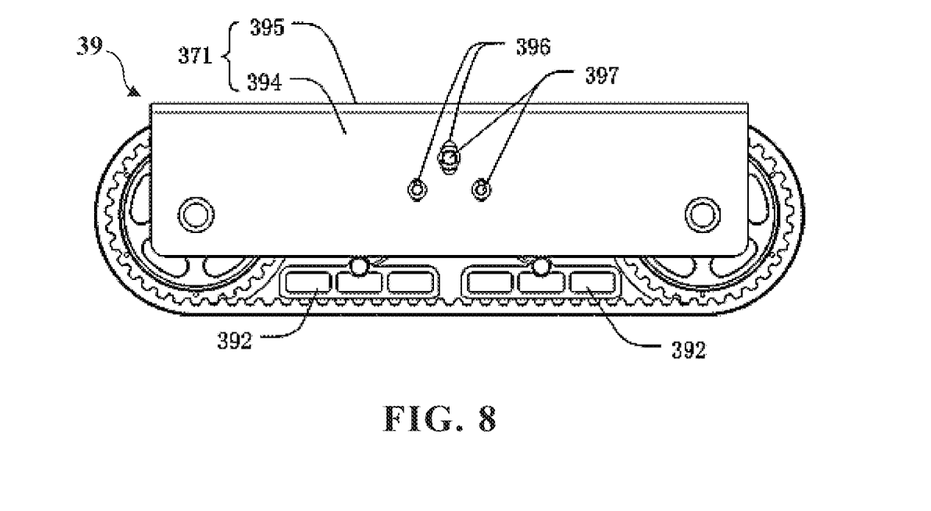
FIG. 8 is a structural schematic view of a first embodiment of a track tension device in the embodiment of the present invention.
Figure 9:
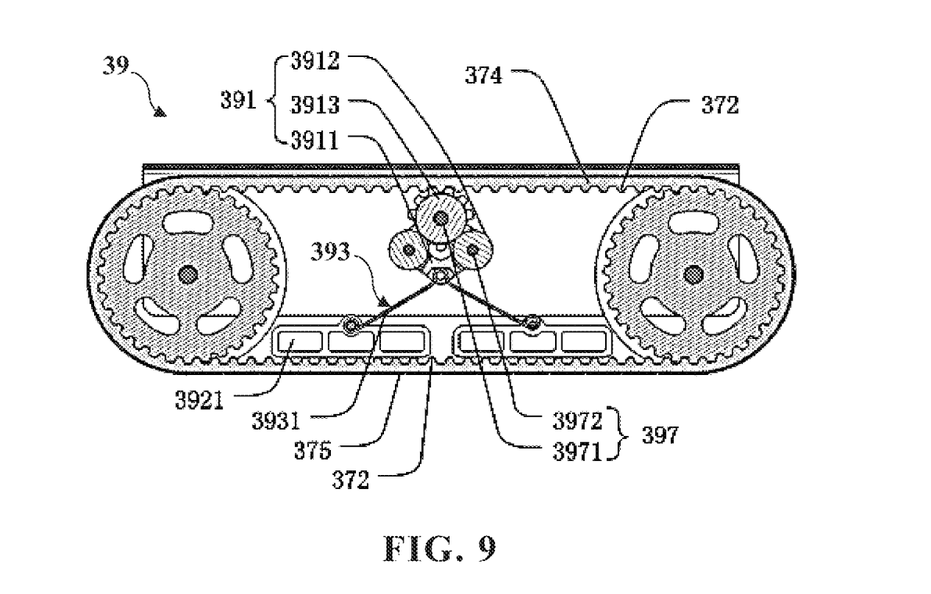
FIG. 9 is a structural schematic view of the first embodiment of the track tension device with removal of the track side plate in the embodiment of the present invention.
Figure 10:
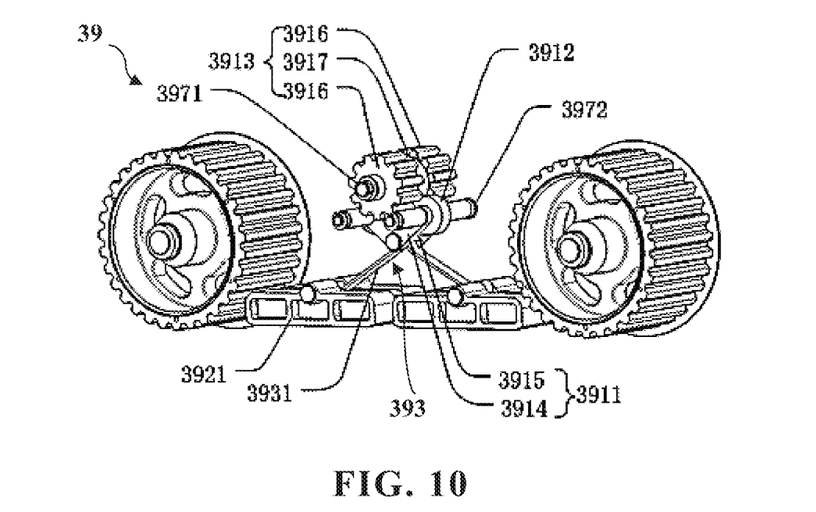
FIG. 10 is a structural schematic view of the first embodiment of the track tension device with removal of the track in the embodiment of the present invention.

The present invention provides the following three track tension devices. With reference to FIGS. 8 to 10, the first embodiment the track tension device 39 includes an upper tension portion 391, a lower compression portion 392 and a resilient support portion 393.

The track 37 is a flexible link loop having the track inner teeth 372 evenly disposed on the inner sidewall of each track 37. The track 37 includes a transmission belt having an upper run 374 and a lower run 375. The upper run 374 is an upper portion of the track 37, the lower run 375 is a lower portion of the track 37, at least one track inner tooth 372 is disposed on a lower surface of the upper run 374, and at least one track inner tooth 372 is disposed on an upper surface of the lower run 375.

The upper tension portion 391 has an upper end disposed tangentially to or engaged with the lower surface of the upper run 374, and is configured to tension the upper run 374. During the moving of the track, the upper tension portion 391 and the upper run 374 are slidably or rotatably connected to each other. The lower compression portion 392 has a lower end disposed tangentially to the upper surface of the lower run 375, and is configured to compress the lower run 375. The resilient support portion 393 having an end connected to the upper tension portion 391 and another end connected to the lower compression portion 392, and is configured to support the upper tension portion and the lower compression portion.

With reference to FIG. 8, the track tension device 39 may include two track side plates 394 disposed respectively on two sides of the track 37. The two track side plates 394 may be connected to each other through a track top plate 395 to form an integral track housing 371. The track housing 371 is securely connected to the wheel axis of the robot body 1 through at least one bolt. At least one perpendicular longitudinal slot 396 is disposed perpendicularly in an upper portion of each track side plate 394. The track tension device 39 further includes at least one installing shaft 397 having two ends up-and-down-slidably disposed respectively in opposite two longitudinal slots 396. The two longitudinal slots 396 are located respectively on the two track side plates 394. The installing shaft 397 and the parts assembled on the installing shaft 397 can move up and down in a range limited by the longitudinal slot 396. The track tension device 39 may only include one track side plate 394 disposed on one side of the track 37 of the robot. At least one longitudinal slot is perpendicularly disposed in the upper portion of the track side plate, and an end of the installing shaft 397 is up-and-down-slidably disposed in one longitudinal slot 396. The present invention preferably has a solution of disposing three longitudinal slots in one track side plate, the three longitudinal slots are arranged respectively in three vertices of a triangle.

The installing shaft 397 includes at least one gear installation shaft 3971 and at least one transmission-wheel installation shaft 3972. The gear installation shaft 3971 parallels the transmission-wheel installation shaft 3972. The gear installation shaft 3971 is located above a middle place between two transmission-wheel installation shafts 3972. The present invention preferably has one gear installation shaft 3971 and two transmission-wheel installation shafts 3972. The gear installation shaft 3971 and the two transmission-wheel installation shafts 3972 are arranged respectively in three vertices of a triangle. The upper tension portion 391 includes a V-shaped bracket 3911, at least one tension transmission wheel 3912 and at least one tension gear 3913. The present invention preferably has one tension gear 3913 and two tension transmission wheels 3912. The tension gear 3913 and the two tension transmission wheels 312 are arranged respectively in three vertices of a triangle.

Two transmission-wheel installation shafts 3972 are disposed respectively on two ends of an upper portion of the V-shaped bracket 3911. The V-shaped bracket 3911 includes two paralleling V-shaped planar plates 3914 and two crossbeams 3915. Two ends of each crossbeam 3915 are securely connected respectively to the two V-shaped planar plates 3914. The transmission-wheel installation shafts 3972 are perpendicularly to the V-shaped planar plates 3914. The gear installation shaft 3971 is disposed above the V-shaped bracket 3911, and faces a middle place of the transmission-wheel installation shafts 3972. A lower end of the V-shaped bracket 3911 is connected to the resilient support portion 393.

The tension transmission wheel 3912 is installed on the transmission-wheel installation shaft 3972 through a roller bearing (not shown in the figures). Each tension gear is installed on a gear installation shaft 3971 through a roller bearing (not shown in the figures), and an end of the tension gear is engaged with the lower surface of the upper run 374.

Two tension transmission wheels 3912 are disposed on lower portions of two sides of the tension gear 3913. The tension transmission wheels 3912 are disposed tangentially to or engaged with the tension gear 3913, and both of them can achieve transmission. The tension gear 3913 and the tension transmission wheels 3912 may have gear surfaces or non-gear surfaces. If gear surfaces are implemented, both of them are engaged with each other. If non-gear surfaces are implemented, both of them are disposed tangentially to each other.

In the present invention, the tension gear 3913 is a double straight tooth cylindrical gear, and specifically includes two cylindrical gears 3916 and a cylindrical linkage portion 3917. The two cylindrical gears 3916 are engaged with the lower surface of the upper run 374. the cylindrical linkage portion 3917 are disposed between the two cylindrical gears 3916. Diameters of the two cylindrical gears 3916 are the same. A diameter of the linkage portion 3917 is less than a diameter of the cylindrical gear 3916. Each tension transmission wheel 3912 is disposed tangentially to the linkage portion 3917 of the tension gear 3913.

The lower compression portion 392 is at least one tension compression plate 3921, and preferably two tension compression plates 3921 are disposed tangentially to the upper surface of the lower run 375. The resilient support portion 393 includes a reverse V-shaped resilient element 3931, an upper portion of the reverse V-shaped resilient element 3931 connected to a lower end of the upper tension portion 391, i.e. a corner of a lower end of the V-shaped bracket 3911. Two ends of a lower portion of the reverse V-shaped resilient element 3931 are connected respectively to two lower compression portions 392, i.e. tension compression plates 3921.

The corner of the lower end of the V-shaped bracket 3911 has a curved hole, a corner of the upper portion of the reverse V-shaped resilient element 3931 is a semicircular angle. The upper portion of the reverse V-shaped resilient element 3931 with the semicircular angle is assembled in the curved hole. Two ends of the lower portion of the reverse V-shaped resilient element 3931 are connected respectively two circular hooking rings, and the two circular hooking rings are connected respectively to the two lower compression portions 392, i.e. upper surfaces of the tension compression plates 3921. Specifically, a recess is disposed in each tension compression plate 3921, and a tension compression plate 3921 connection shaft is disposed in the recess. Each circular hooking ring is correspondingly connected to a connection shaft of the tension compression plate 3921.

During the operation of the track of the present invention, because the track 37 is a flexible link loop, the track inner tooth in the inner surface of the track is engaged with the sidewalls of the front and rear hubs. Meanwhile, the tension gear 3913 is also engage with the lower surface of the upper run 374. The track 37 rolling forward drives the tension gear 3913 to rotate.

The reverse V-shaped resilient element 3931 has a small open angle before the above parts are assembled. After assembly of the above parts, the reverse V-shaped resilient element is deformed and the open angle increases such that the track 37 is in tension, in which case the reverse V-shaped resilient element has a tendency to recover its original shape (smaller open angle).

When the track with the hubs moves forward and backward, the track 37 acts on the tension gear 3913 and drives the tension gear 3913 to rotate, that is, it is equivalent to the force applied by the track 37, which generates a downward force and pushes the tension gear 3913 to move downward along the longitudinal slot 396. In the meantime, the tension transmission wheel 3912 and the tension gear 3913 are tangent and moved downward by the action of the tension gear 3913 to further compress the reverse V-shaped resilient element 3931. At this moment, the angle of the reverse V-shaped resilient element 3931 continues to increase, the deformation of the reverse V-shaped resilient element 3931 increases, and the resulting resilient force further increases.

When the track and the tension gear 3913 are separated from each other, or the tension gear 3913 is spaced apart from the transmission wheels, the reverse V-shaped resilient element 3931 releases a portion of the compressed elastic potential energy, the open angle becomes smaller, and the track 37 is tensioned again. According to the motion state of the track 37, the resilient support portion 393 can adjust the tension force in real time, reducing the rigid friction between the parts and enhancing the service life of the parts.

Figure 11:
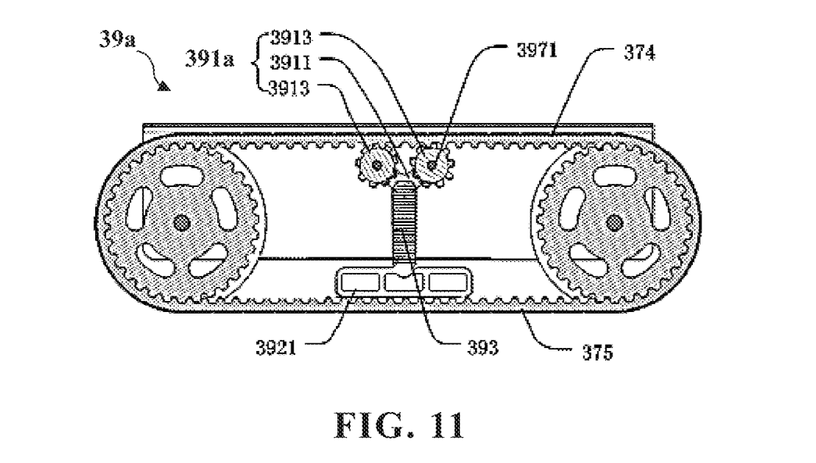
FIG. 11 is a structural schematic view of a second embodiment of the track tension device with removal of the track side plate in the embodiment of the present invention.

With reference to FIG. 11, the present invention also provides a second embodiment of the track tension device 39a, most of technical solutions thereof are the same as those of the first embodiment of the track device, and the different technical features are as follows. In the second embodiment of the track tension device, the installing shaft 397 only includes at least one gear installation shaft 3971, and does not include the transmission-wheel installation shaft 3972. Preferably, two gear installation shafts 3971 paralleling each other. The upper tension portion 391 includes a V-shaped bracket and at least one tension gear 3913, the present invention preferably includes two tension gears 3913, and the two tension gears 3913 are arranged in three vertices of a triangle. The two gear installation shafts 3971 are disposed respectively on two ends of an upper portion of the V-shaped bracket 3911. The gear installation shafts 3971 are perpendicular to the V-shaped planar plates 3914. The lower compression portion 392 is at least one tension compression plate 3921, and is disposed tangentially to the upper surface of the lower run 375. The resilient support portion 393 may be a spring set composed of one or more springs, and may be a rubber pad. An end of the resilient support portion 393 is connected to the lower end of the upper tension portion 391a, i.e. the corner of the lower portion of the V-shaped bracket 3911, and another end of the resilient support portion 393 is connected to the lower compression portion 392, i.e. the tension compression plate 3921. The second embodiment of the track tension device is more structurally simpler with lower cost but has poorer tension effect, and therefore material requirement for the resilient support portion 393 is higher. Its working principle is similar to the first embodiment of the track tension device, and no further description is given here.

Figure 12:
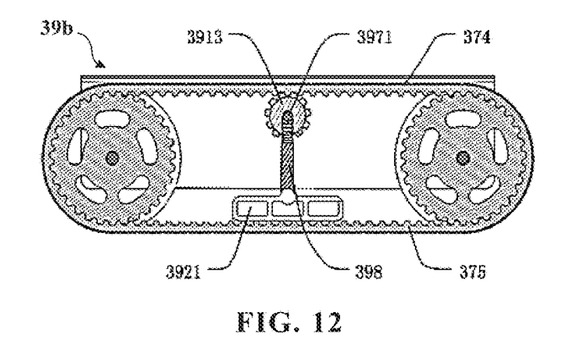
FIG. 12 is a structural schematic view of a third embodiment of the track tension device with removal of the track side plate in the embodiment of the present invention.

With reference to FIG. 12, the present invention also provides a third embodiment of the track tension device 39b, most of the technical solutions are the same as those of the second embodiment of the track device, the different technical feature is that the upper tension portion 391b includes at least one tension gear 3913, preferably one tension gear 3913 is installed on a gear installation shaft 3971 through a roller bearing. The third embodiment of the track tension device further includes a gear bracket 398 substituted for the V-shaped bracket. The gear installation shaft 3971 is installed on an upper end of the gear bracket 398, and the resilient support portion 393 is connected to a lower end of the gear bracket 398. The lower compression portion 392 is at least one tension compression plate 3921. The resilient support portion 393 is a spring set composed of one or more springs, and may be a rubber pad. An end of the resilient support portion 393 is connected to the lower end of the gear bracket 398, and another end of the resilient support portion 393 is connected to the tension compression plate 3921. The third embodiment of the track tension device is more structurally simpler with lower cost but has poorer tension effect, and therefore material requirement for the resilient support portion 393 and gear bracket 398 is higher. Its working principle is similar to the second embodiment of the track tension device, and no further description is given here.

In the present invention, the technical effect of the track tension device is that a "sliding assembly design" is employed. In other words, a resilient support portion 393 is added between the upper tension portion 391 and the lower compression portion 392. Through the longitudinal slot, up-and-down floating of the tension device is achieved, tension force during moving of the track is real-timely adjusted. Such adjustment, according to the track operation to achieve flexible adjustment, can mitigate wear and tear of the parts of rigid adjustment, reduce the friction between parts and increase the service life of the track. The adjusted track can timely adapt to the road. The track moving device with the track tension device can achieve power-saving purposes. The track tension device is structurally simple and is easy to assemble.

Figure 13:
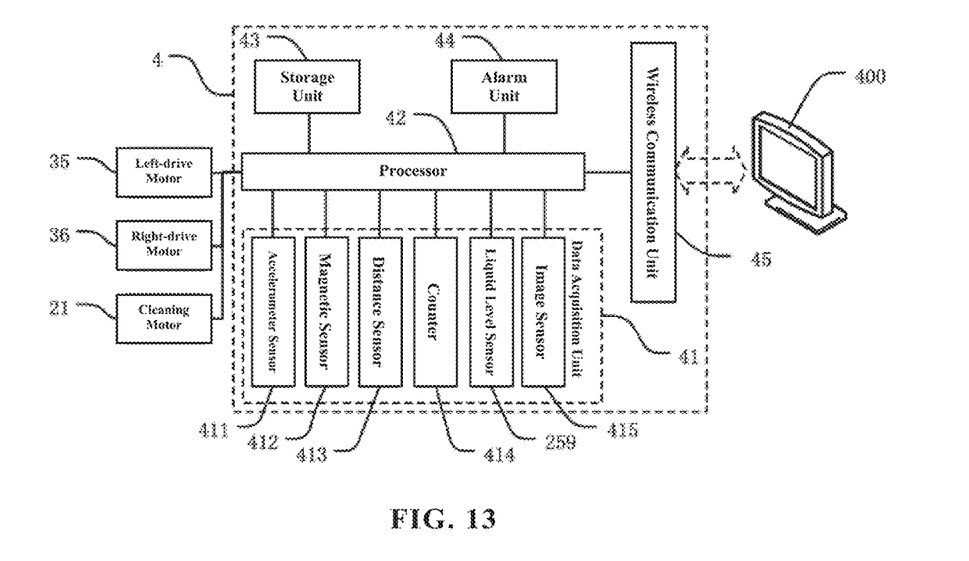
FIG. 13 is a structural block diagram of the control system in the embodiment of the present invention.

With reference to FIG. 13, in the present invention, the control system 4 includes a data acquisition unit 41, a processor 42 and at least one storage unit 43. The data acquisition unit 41 includes various sensors, and is configured to acquire at least one working parameters during the moving of the robot body 1. The processor 42 is connected to the data acquisition unit 41, transmits at least one moving control instruction to the power system 3 according to the working parameters, and transmits at least one cleaning control instruction to the cleaning device 2 according to the working parameters. The storage unit 43 is connected to the processor 42, is configured to store working parameters and other pre-calculated or preset parameters during the moving of the robot body 1. The working parameters include real-time acceleration data and real-time moving direction data of the robot body 1, real-time liquid level data of the liquid dispensing container, distance between each distance sensor and the solar panel, images in front of the robot body, etc. Pre-calculated or preset parameters include various working data predetermined by a staff member, such as a pre-calculated and pre-planned cleaning robot moving path (optimized path), a liquid level alarm threshold value in the liquid dispensing container 25 (when the threshold value is reached, the alarm unit is activated), liquid level shutdown threshold value (when the threshold value is reached, the water pump 28 stop operating), etc.

A staff member records a planned optimized path in the control system 4 in advance to provide the robot body of the cleaning robot with path navigation. The control system 4 calculates and plans according to the optimized path, and transmits various of signals of when to switch on, when to switch stop, when to move straight, when to implement left or right 90 degrees U-turn to the power system in forms of control instructions to control actions of the moving robot body.

The data acquisition unit 41 further includes a liquid level sensor 259 connected to the processor 42 and configured to acquire liquid level in the liquid dispensing container 25 in real-time. During work of the cleaning device, the control system 4 may transmit at least one water pump 28 control signal to the water pump 28 according to real-time liquid level data in the liquid dispensing container 25 to start or stop operation of the water pump 28, or to control discharging speed of liquid. For example, when real-time liquid level data in the liquid dispensing container 25 decreases to a predetermined threshold value, the control system 4 can transmit a water pump decelerating instruction controlling the water pump 28 to slow down water pumping speed. When real-time liquid level data in the liquid dispensing container 25 decreases to the lowest point, or, when the control system 4 transmits a robot body stopping instruction, the control system 4 can transmit a water pump stopping instruction controlling the water pump 28 to stop operation.

The control system 4 also includes at least one alarm unit 44 connected to the processor 42. The alarm unit 44 may be a red light or a buzzer disposed on the external of the robot body. When a certain working parameter exceeds the predetermined threshold value, the alarm unit transmits an alarming signal. For example, when the liquid level of the liquid dispensing container 25 is lower than a certain predetermined threshold value, or when the electric power system 5 has insufficient electric power, or when the cleaning robot transmits a malfunction signal, the alarm unit 44 may transmit an alarming signal to warn a user.

The data acquisition unit 41 includes at least one image sensor 415 or camera connected to the processor 42, disposed on the front end of the robot body 1 (with reference to FIGS. 2 and 3) and configured to acquire images in front of the robot body 1 during the moving of the robot body 1. These images can be stored in the storage unit for a staff member to check the working status of robot.

In the present invention, technical effect of the control system 4 is providing various methods for the cleaning robot to move along an optimized path on the solar panel and methods for controlling the robot to move straight on the sloping plane to ensure the robot to non-repeatedly move through the entire space of the solar panel with large coverage area without the robot falling out from an edge of the solar panel, which assures both the cleaning effect and working efficiency.

The solar panel cleaning robot 100 may also include at least one wireless communication unit 45 wirelessly connected to a server 400, and configured to build communication between the solar panel cleaning robot 100 and server 400. Images in front of the robot body 1 can be real-timely transmitted to the server 400 such that a staff member may efficiently implement monitoring during the working progress of the cleaning robot, which solves the technical issue that monitoring the clean robot on the conventional solar panel becomes difficult when the solar panel is high.

In the present invention, with reference to FIG. 3, the electric power system 5 is one or a set of disposable batteries or rechargeable batteries (not shown in the figures) disposed in the battery box 51. A staff member needs to regularly remove the cleaning robot from the solar panel and replace or charge the battery therein to allow the clean robot to continue to work.

The present invention provides a solar panel cleaning robot that may freely move on the solar panel and effectively remove the dust on the panel and other attachments, and decontamination effect thereof is excellent. During operation of the cleaning robot of the present invention on the solar panel, the cleaning robot can non-repeatedly cover the entire space of the solar panel according to the preset optimized path with high working efficiency. The cleaning robot of the present invention can automatically turn or back turn according to the program to achieve automatic control and is easy to operate.

The present invention provides a track moving device including the above track cleaning robot for cleaning the solar panel, and further including a device with a track such as a track toy car, a track motor vehicle, etc.

The above is only the preferred embodiment of the present invention. It should be noted that those skilled in the art, without departing from the principle of the present invention, can also make some improvements and modifications, these improvements and modifications should be deemed as the protection scope of the present invention.

What is claimed is:

1. A track tension device configured for a track, wherein the track tension device comprises:
   an upper run being an upper portion of a transmission belt disposed on the track, and at least one track inner tooth disposed on a lower surface of the upper run;
   a lower run being a lower portion of the transmission belt, and at least one track inner tooth disposed on an upper surface of the lower run;
   an upper tension portion having an upper end disposed tangentially to or engaged with the lower surface of the upper run, and configured to tension the upper run;
   at least one lower compression portion having a lower end disposed tangentially to the upper surface of the lower run, and configured to compress the lower run; and
   a resilient support portion having an end connected to the upper tension portion and another end connected to the lower compression portion, and configured to support the upper tension portion and the lower compression portion;
   the track tension device further comprises:
   a track side plate disposed on a side of the track;
   at least one longitudinal slot perpendicularly disposed in an upper portion of the track side plate;
   at least one installing shaft, an end of each installing shaft up-and-down-slidably disposed in one longitudinal slot;
   wherein the installing shaft comprises at least one gear installation shaft;
   wherein the upper tension portion comprises at least one tension gear, each tension gear installed on one gear installation shaft through a roller bearing and having an upper end engaged with the lower surface of the upper run;
   wherein the tension gear is a double straight tooth cylindrical gear and comprises:
   two cylindrical gears engaged with the lower surface of the upper run; and
   a linkage portion disposed between the two cylindrical gears; and
   wherein diameters of the two cylindrical gears cylindrical gear are the same, and a diameter of the linkage portion is less than a diameter of the cylindrical gear.

2. The track tension device as claimed in claim 1, wherein the installing shaft further comprises at least one transmission-wheel installation shaft;
   the upper tension portion further comprises:
   at least one tension transmission wheel, each tension transmission wheel disposed on a transmission-wheel installation shaft through a roller bearing, and disposed tangentially to or engaged with the tension gear; and
   a V-shaped bracket having two transmission-wheel installation shafts disposed respectively on two ends of the V-shaped bracket, and a gear installation shaft disposed above the V-shaped bracket;
   wherein the gear installation shaft and the transmission-wheel installation shafts parallel each other, and the gear installation shaft is located above a middle place between the two transmission-wheel installation shafts.

3. The track tension device as claimed in claim 2, wherein the V-shaped bracket comprises:

two V-shaped planar plates paralleling each other; and two crossbeams, two ends of each crossbeam securely connected respectively to the two V-shaped planar plates;

wherein the transmission-wheel installation shafts or the gear installation shaft is perpendicular to the V-shaped planar plate.

4. The track tension device as claimed in claim 1, wherein the track tension device further comprises:

two track side plates disposed respectively on two sides of the track;

the at least one longitudinal slot disposed perpendicularly in an upper portion of each track side plate;

the at least one installing shaft, two ends of each installing shaft up-and-down-slidably disposed respectively in opposite two of the longitudinal slots, and the opposite two of the longitudinal slots located respectively on the two track side plates.

5. The track tension device as claimed in claim 4, wherein the tension gear is a double straight tooth cylindrical gear and comprises:

two cylindrical gears engaged with the lower surface of the upper run; and a linkage portion disposed between the two cylindrical gears;

wherein diameters of the two cylindrical gears cylindrical gear are the same, and a diameter of the linkage portion is less than a diameter of the cylindrical gear.

6. The track tension device as claimed in claim 4, wherein the installing shaft further comprises at least one transmission-wheel installation shaft;

the upper tension portion further comprises:

at least one tension transmission wheel, each tension transmission wheel installed on a transmission-wheel installation shaft through a roller bearing, and disposed tangentially to or engaged with the tension gear; and a V-shaped bracket having two transmission-wheel installation shafts disposed respectively on two ends of the V-shaped bracket, and a gear installation shaft disposed above the V-shaped bracket;

wherein the gear installation shaft and the transmission-wheel installation shafts parallel each other, and the gear installation shaft is located above a middle place between the two transmission-wheel installation shafts.

7. The track tension device as claimed in claim 6, wherein the V-shaped bracket comprises:

two V-shaped planar plates paralleling each other; and two crossbeams, two ends of each crossbeam securely connected respectively to the two V-shaped planar plates;

wherein the transmission-wheel installation shafts or the gear installation shaft is perpendicular to the V-shaped planar plate.

8. The track tension device as claimed in claim 1, wherein the lower compression portion comprises:

at least one tension compression plate disposed tangentially to the upper surface of the lower run.

9. The track tension device as claimed in claim 1, wherein the resilient support portion comprises:

a reverse V-shaped resilient element, an upper portion of the reverse V-shaped resilient element connected to a lower end of the upper tension portion, and two ends of a lower portion of the reverse V-shaped resilient element connected respectively to two lower compression portions.

10. The track tension device as claimed in claim 9, wherein the upper end of the reverse V-shaped resilient element is a semicircular corner; and two circular hooking rings are disposed respectively on the two ends of the lower portion of the reverse V-shaped resilient element, the circular hooking rings are connected respectively to the two lower compression portions.

11. A track moving device, comprising the track tension device as claimed in claim 1.

* * * * *